US012639367B2

(12) United States Patent  
Wang et al.

(10) Patent No.: US 12,639,367 B2  
(45) Date of Patent: May 26, 2026

(54) FAST ONE-SHOT OPEN VOCABULARY IMAGE-CONDITIONED DETECTION AND SEARCH METHOD FOR UTILITY ASSETS

(71) Applicant: X Development LLC, Mountain View, CA (US)

(72) Inventors: Xin-Jing Wang, Mountain View, CA (US); Anthony Ha, Milpitas, CA (US)

(73) Assignee: X Development LLC, Mountain View, CA (US)

( * ) Notice: Subject to any disclaimer, the term of this patent is extended or adjusted under 35 U.S.C. 154(b) by 245 days.

(21) Appl. No.: 18/242,739

(22) Filed: Sep. 6, 2023

(65) Prior Publication Data

US 2025/0077571 A1 Mar. 6, 2025

(51) Int. Cl.
| | |
|---|---|
| *G06F 16/58* | (2019.01) |
| *G06F 16/535* | (2019.01) |
| *G06T 7/11* | (2017.01) |
| *G06V 20/70* | (2022.01) |

(52) U.S. Cl.
CPC ............ *G06F 16/58* (2019.01); *G06F 16/535* (2019.01); *G06T 7/11* (2017.01); *G06V 20/70* (2022.01)

(58) Field of Classification Search
None
See application file for complete search history.

(56) References Cited

U.S. PATENT DOCUMENTS

| | | | | |
|---|---|---|---|---|
| 10,748,346 B2 * | 8/2020 | Chia | ..................... | G06F 16/583 |
| 2014/0376819 A1 * | 12/2014 | Liu | ......................... | G06T 7/187 |
| | | | | 382/205 |
| 2021/0224312 A1 * | 7/2021 | Harikumar | ............ | G06F 16/532 |
| 2024/0054748 A1 * | 2/2024 | Gonsalves | ................ | G06T 7/70 |

OTHER PUBLICATIONS

Amato, G.—"The Visione Video Search System: Exploiting Off-The-Shelf Text Search Engines for Large-Scale Video Retrieval"—arXiv—Mar. 18, 2021—pp. 1-22 (Year: 2021).*
Black et al., "Visualizing Paired Image Similarity in Transformer Networks," WACV, 2022, pp. 3164-3173.

(Continued)

*Primary Examiner* — Bernard Krasnic
(74) *Attorney, Agent, or Firm* — Fish & Richardson P.C.

(57) ABSTRACT

This disclosure describes a system, method, and non-transitory computer-readable medium for image search-based object detection of utility assets in image databases. The method includes receiving an input image of a utility asset and a query bounding box representing an image-based object query. Bounding boxes of objects represented in the input image are generated based on the input image and the query bounding box, in which anchoring boxes corresponding to object classifications are identified from the bounding boxes. A textual label is determined for a selected subset of anchoring boxes. An image embedding representing the region is encoded, and image tokens are generated based on the encoded image embedding. Output images of other utility assets relevant to the image-based object query are identified from images in an image database, based on at least one of (i) the encoded image embedding, (ii) the image tokens, or (iii) the textual label. The output images are provided for output.

20 Claims, 6 Drawing Sheets

(56)           References Cited

OTHER PUBLICATIONS

Docs.ultralytics.com [online], "Ultralytics YOLOv8 Docs," Sep. 28, 2021, retrieved on Sep. 11, 2023, retrieved from URL<https://pjreddie.com/darknet/yolo//>, 3 pages.
Dosovitskiy et al., "An Image is Woth 16x16 Words: Transformers for Image Recognition at Scale," CoRR, Jun. 3, 2021, arXiv:2010.11929v2, 22 pages.
El-Nouby et al., "Training Vision Transformers for Image Retrieval," CoRR, arXiv:2102.05644v1, Feb. 10, 2021, 10 pages.
Minderer et al., "Simple Open-Vocabulary Object Detection with Vision Transformers," European Conference on Computer Vision, 2022, pp. 728-755.
Pjreddie.com [online], "YOLO: Real-Time Object Detection," Jun. 2015, retrieved on Sep. 11, 2023, retrieved from URL<https://pjreddie.com/darknet/yolo//>, 10 pages.
Zareian et al., "Open-Vocabulary Object Detection Using Captions," CoRR, arXiv:2011.10678v2, Mar. 14, 2021, 12 pages.

* cited by examiner

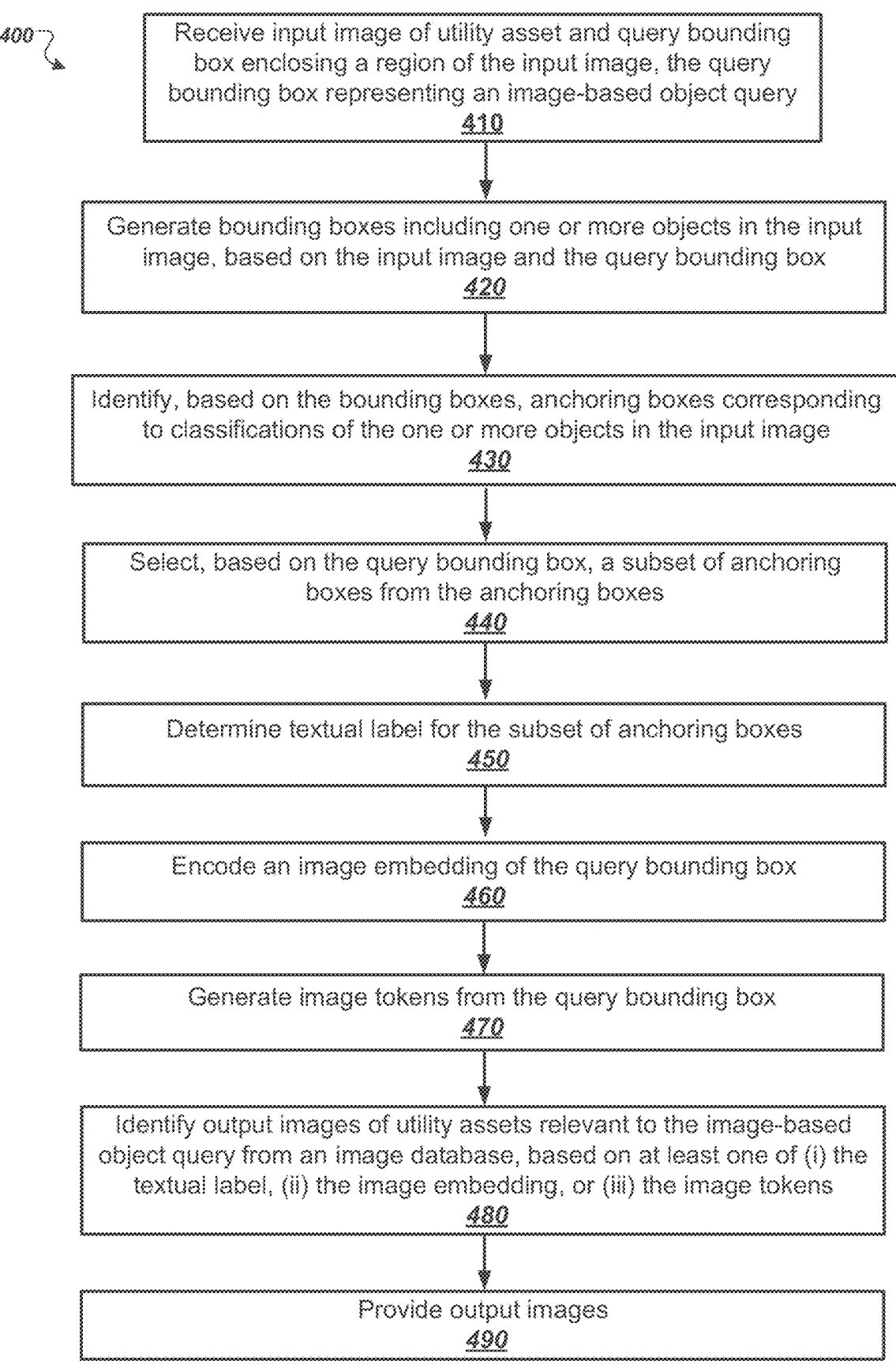

400

Receive input image of utility asset and query bounding box enclosing a region of the input image, the query bounding box representing an image-based object query
410

Generate bounding boxes including one or more objects in the input image, based on the input image and the query bounding box
420

Identify, based on the bounding boxes, anchoring boxes corresponding to classifications of the one or more objects in the input image
430

Select, based on the query bounding box, a subset of anchoring boxes from the anchoring boxes
440

Determine textual label for the subset of anchoring boxes
450

Encode an image embedding of the query bounding box
460

Generate image tokens from the query bounding box
470

Identify output images of utility assets relevant to the image-based object query from an image database, based on at least one of (i) the textual label, (ii) the image embedding, or (iii) the image tokens
480

Provide output images
490

Search, based on textual label, for subset of images from image database
510

Filter, based on the image tokens, the subset of image a filtered subset of images
520

Determine, based on image embedding, a similarity score for each image in the filtered subset of images
530

Identify one or more output images from the filtered subset of images based on a threshold value
540

FAST ONE-SHOT OPEN VOCABULARY IMAGE-CONDITIONED DETECTION AND SEARCH METHOD FOR UTILITY ASSETS

BACKGROUND

This disclosure generally relates to images of utility assets, including images capturing defects of utility assets.

Utility assets (e.g., transformers, network protectors, cables, utility poles, power stations, and substations) develop defects while distributing and transmitting power for an electrical grid. The utility assets perform complex functions to provide power from the electrical grid to loads at voltage and current levels suitable for residential, industrial, and commercial applications. Utility assets experience different types of defects (e.g., corrosion, wear and tear, environmental factors, and other types of physical damage), with varying impact to the performance and life cycle of the utility asset. Images of a particular utility asset can sometimes be captured during the lifecycle of the utility asset, e.g., by utility workers during inspections, maintenance, and other types of work performed on the utility asset. There is a growing interest in leveraging the images captured during field work to identify defects of utility assets to take preventative action to prevent operational failure of the utility asset.

SUMMARY

This specification describes techniques that involve a system, and operations for an object search system for performing object detection and search of utility assets in an image database. The object search system performs image search-based object detection by receiving an input image of a utility asset and a query bounding box representing an image-based object query. The query bounding box encloses a region of the input image that contains a portion of the utility asset. The object search system generates bounding boxes containing one or more objects represented in the input image, based on the input image and the query bounding box, and identifies anchoring boxes based on the bounding boxes. The anchoring boxes correspond to classifications of one or more objects. From the anchoring boxes and based on the query bounding box, the object search system selects a subset of anchoring boxes from the anchoring boxes and determines a textual label representing object annotations for the subset of anchoring boxes. The object search system encodes an image embedding of the query bounding box and generates one or more image tokens from the encoded image embedding. The one or more image tokens represent an input element of the query bounding box. The object search system identifies, from an image database that includes a plurality of images, one or more output images of other utility assets relevant to the image-based object query, based on the encoded image embedding, the one or more image tokens, and the textual label. The object search system provides one or more images for output.

The object search system can also provide the one or more output images for output by searching for a subset of images from the one or more images of the image database based on the textual label. The subset of images can exclude one or more images of the image database that do not include a label that matches the textual label. The object search system filters the subset of images to determine a filtered subset of images based on the one or more image tokens. The filtered subset of images can exclude one or more images of the subset images that do not include at least one token from the one or more image tokens. The object search system determines a similarity score for each image in the filtered subset of images, based on the image embedding. The similarity score indicates a likelihood of a respective image matching the image embedding of the query image. The object search system also identifies the one or more output images from the filtered subset of images that have a similarity score exceeding a threshold value.

Particular embodiments of the subject matter described in this specification can be implemented to realize one or more of the following technical advantages. As described in this specification, utility assets can include a wide variety of defects that are difficult to detect. In some cases, there are few examples of particular types, instances, or some combination thereof, of utility asset defects that are captured and stored in image databases. The object search system enables a coarse-to-fine search approach for detecting and identifying asset defects when performing object detection and search of an image-based query example. The object search system utilizes a variety of machine learning techniques and models to generate data structures representing image data from the query image, and query data from a query bounding box indicated for the query image. The object search system utilizes trained models to detect objects in the query image, generate auto-anchoring boxes to predict features in the query image, and selects a subset of anchoring boxes that match the query example. By selecting a subset of anchoring boxes, the object search system provides search results that are stable and efficient, e.g., compared to approaches that do not limit anchoring boxes to a subset and match to the query bounding box of the query image.

The object search system provides one-shot image-conditioned detection of images of utility assets, and search using an open-vocabulary, to provide output images that match a query example, e.g., a query image and query bounding box indicating a defect of interest in the query image. The object search system provides one-shot image detection of utility assets by generating auto-anchoring boxes for the query bounding box provided in the query example. The auto-anchoring boxes are generated from a model tailored to predicting sparse features in image data of utility assets, such as defects that can be difficult to detect in large-scale image databases. The object search system provides open-vocabulary search by generating visual tokens from the query example and visual embeddings from the query example to capture feature data of the defects in the query and matching to feature data of defects of image data in image databases. The matching process of feature data represented in the query example and the image data from image databases provides that search results from the object search system are accurate and efficiently determined.

As described in this specification, the object search system utilizes a three-stage image search approach for identifying and ranking images that match the query example, e.g., capturing similar types and instances of defects. The first stage of the object search system provides filtering for images of utility assets that match the utility asset indicated by the query image, while the second stage filters images resulting from the first stage for images that include similar types of defects (e.g., based on feature data). The third stage filters for images in the image database that include image tokens that match the image token for the query bounding box, from the resulting images of the second stage filter. The multiple stage approach of the object search system provides models utilized for each particular search stage that can be tailored and individually trained. For example, some models can be trained to generate visual tokens for the defects captured in the image of the query example, while other models can be trained to generate image embeddings for the utility assert represented in the query image. Tailoring each stage of filtering provides that the object search system can handle unbalanced data, assets with few examples in the image databases, and images from a wide variety of sources, to provide output images similar to the image-based query example.

These and other embodiments can each optionally include one or more of the following features.

In an aspect, a method for image search-based object detection includes receiving input data that includes an input image of a utility asset and a query bounding box, the query bounding box enclosing a region of the input image that contains a portion of the utility asset representing an image-based object query. The method includes generating bounding boxes based on the input image and the query bounding box, the bounding boxes include one or more objects represented in the input image. The method also includes identifying anchoring boxes based on the bounding boxes, the anchoring boxes corresponding to classifications of the one or more objects and selecting, based on the query bounding box, a subset of anchoring boxes from the anchoring boxes. The method includes determining a textual label for the subset of anchoring boxes. The method also includes encoding an image embedding of the region of the input image represented by the query bounding box, the image embedding representing the region of the input image. The method includes generating one or more image tokens from the encoded image embedding of the query bounding box, each of the one or more image tokens representing an input element of the query bounding box. The method includes identifying, from an image database that includes a plurality of images, one or more output images of other utility assets relevant to the image-based object query based on at least one of (i) the encoded image embedding, (ii) the one or more image tokens, or (iii) the textual label, and providing, as output, the one or more output images.

In some implementations, the method includes searching, based on the textual label, for a subset of images from the one or more images of the image database. The subset of images includes one or more images of the image database that do not include a label that matches the textual label. The method also includes filtering, based on the one or more image tokens, the subset of images to obtain a filtered subset of images. The filtered subset of images excludes images that do not include at least one token corresponding with the one or more image tokens. The method also includes determining, based on the image embedding, a similarity score for each image in the filtered subset of images. The similarity score indicates a likelihood of a respective image matching the image embedding of the query image. The method includes identifying the one or more output images from the filtered subset of images. The one or more output images each have a respective similarity score that exceeds a threshold value.

In some implementations, the utility asset is at least one of (i) a utility pole, (ii) a transformer, (iii) one or more wires, or (iv) other types of electrical grid distribution equipment. In some implementations, the input image of the utility asset captures at least one of (i) a type of defect, or (ii) one or more instances of a defect, of the utility asset.

In some implementations, identifying the one or more output images includes performing a nearest neighbor search of one or more of the image embeddings of the filtered subset of images from the image embedding of the query bounding box. The method can also include ranking the one or more output images based on the similarity score of the respective output image.

In some implementations, determining the textual label includes determining annotations representing one or more detected objects in the subset of anchoring boxes. In some implementations determining the textual label for the subset of anchoring boxes includes comparing, by a neural network configured to generate textual labels, a ground truth label for the subset of anchoring boxes to the textual label to obtain a comparison result. The method includes updating one or more parameters of the neural network based on the comparison result.

In some implementations, the query bounding box enclosing the region of the input image is provided by at least one of (i) a user interface, or (ii) a set of coordinates, the user interface configured to provide the input image for display and the set of coordinates representing locations of pixels corresponding to the region of the input image enclosed by the query bounding box.

In some implementations, generating the bounding boxes based on the input image and the query bounding box includes providing a training example to a model configured to perform object detection. The training example includes (i) a label for a respective classification of the one or more objects indicating identification of a utility asset and (ii) a sparse set of image data representing the utility asset.

In some implementations, selecting the subset of anchoring boxes from the anchoring boxes includes determining that the subset of anchoring boxes match the query bounding box within a threshold value. The method also includes updating the anchoring boxes by a model configured to perform auto-anchoring of anchoring boxes, based on determining that the subset of anchoring boxes do not match the query bounding box within the threshold value.

In some implementations, encoding an image embedding of the query bounding box includes generating, by a visual transformer encoder and based on the image embedding for the bounding boxes, a reconstructed image. The method includes comparing the reconstructed image to the input image to obtain a comparison result and updating one or more parameters of the visual transformer encoder based on the comparison result.

In an aspect, a system for performing object detection and search of utility assets in an image database includes one or more computers and one or more storage devices storing instructions that are operable, when executed by the one or more computers, to cause the one or more computers to perform operations. The operations include receiving input data that includes an input image of a utility asset and a query bounding box, the query bounding box enclosing a region of the input image that contains a portion of the utility asset representing an image-based object query. The operations also include generating bounding boxes based on the input image and the query bounding box, the bounding boxes including one or more objects represented in the input image. The operations include identifying anchoring boxes based on the bounding boxes, the anchoring boxes corresponding to classifications of the one or more objects. The operations include selecting, based on the query bounding box, a subset of anchoring boxes from the anchoring boxes and determining a textual label for the subset of anchoring boxes. The operations include encoding an image embedding of the region of the input image represented by the query bounding box, the image embedding representing the region of the input image. The operations include generating one or more image tokens from the encoded image embedding of the query bounding box, each of the one or more image tokens representing an input element of the query bounding box. The operations also include identifying, from an image database that includes a plurality of images, one or more output images of other utility assets relevant to the image-based object query based on at least one of (i) the encoded image embedding, (ii) the one or more image tokens, or (iii) the textual label, and providing the one or more output images, as output.

In an aspect, a computer-readable medium storing one or more instructions executable by a computer system to perform operations for object detection and search of utility assets in an image database. The operations include receiving input data that includes an input image of a utility asset and a query bounding box, the query bounding box enclosing a region of the input image that contains a portion of the utility asset representing an image-based object query. The operations also include generating bounding boxes based on the input image and the query bounding box, the bounding boxes including one or more objects represented in the input image. The operations include identifying anchoring boxes based on the bounding boxes, the anchoring boxes corresponding to classifications of the one or more objects. The operations include selecting, based on the query bounding box, a subset of anchoring boxes from the anchoring boxes and determining a textual label for the subset of anchoring boxes. The operations include encoding an image embedding of the region of the input image represented by the query bounding box, the image embedding representing the region of the input image. The operations include generating one or more image tokens from the encoded image embedding of the query bounding box, each of the one or more image tokens representing an input element of the query bounding box. The operations also include identifying, from an image database that includes a plurality of images, one or more output images of other utility assets relevant to the image-based object query based on at least one of (i) the encoded image embedding, (ii) the one or more image tokens, or (iii) the textual label, and providing the one or more output images, as output.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flowchart illustrating an example process performed by an object search system to identify image results from an image-based object query.

DETAILED DESCRIPTION

Figure 1:
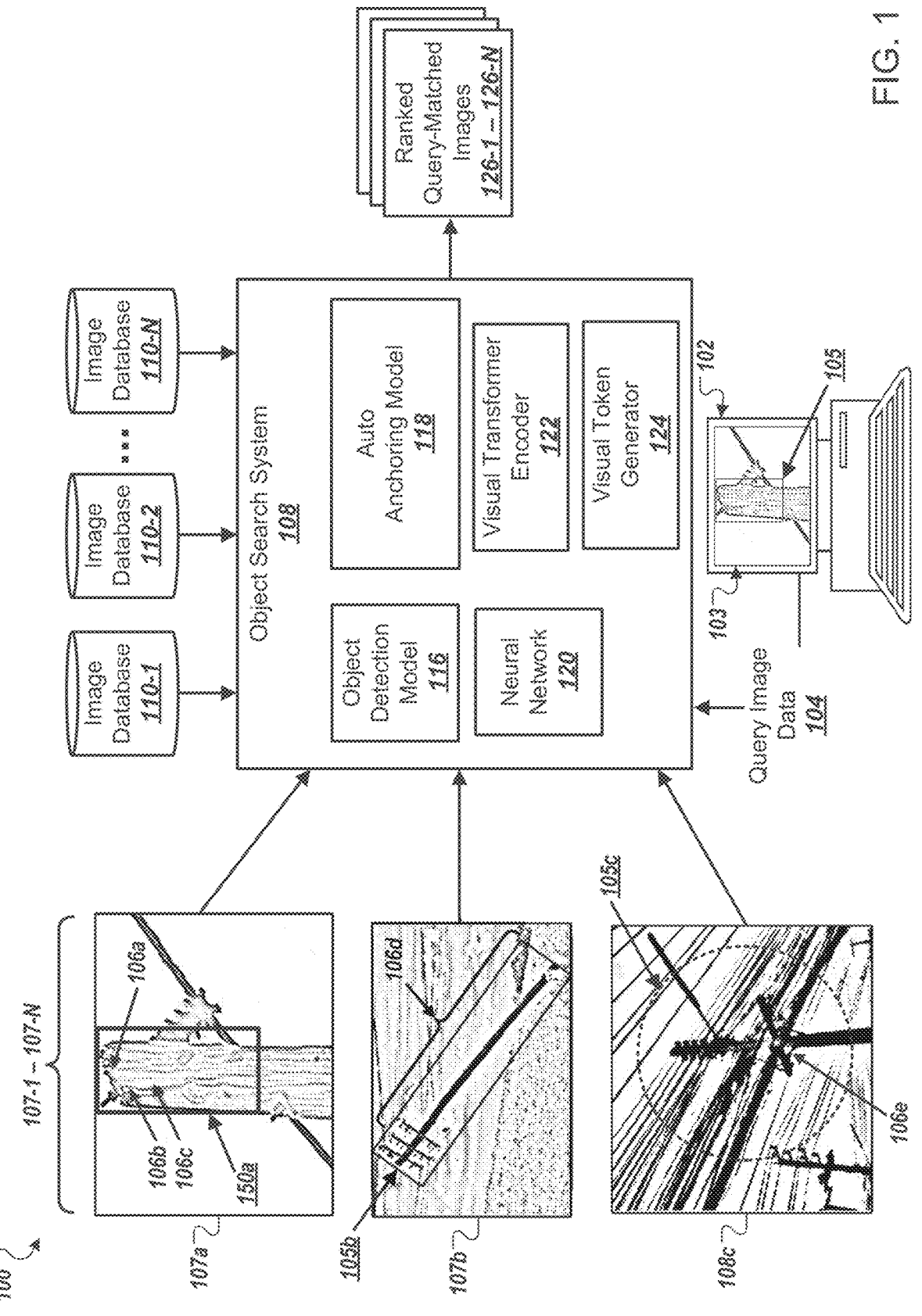
FIG. 1 is a diagram of an example object search system detecting and ranking images of utility assets that match an image-based object query.

In general, the disclosure relates to a method, system, and non-transitory, computer-readable medium for performing fast-detection and image-based query and search using one-shot learning examples in an image database. Image databases can include numerous (e.g., millions) of images of utility assets, such as utility poles/posts, transformers, network protectors, switches, cables, wires, and other types of electrical equipment. Although image databases include images that capture various types of defects of electrical equipment, the large volume of images can be difficult to parse for a particular type of defect, e.g., to provide all images capturing utility assets with the particular type of defect. Therefore, it is difficult to determine patterns or insights of types of defects from image data to improve electric grid operation, e.g., prioritizing the replacement or refurbishment of the utility asset.

Searching for images of utility assets in image databases with similar defects is difficult due to the large volume of images in the image databases. Each image of a utility asset in the image databases also includes large volumes of feature data. Defects can represent a small portion of the feature data for an image, and therefore can be difficult to identify and classify in an image when few examples of the defects exist in the images from the image databases. Therefore, the large volume of images in the image databases and the unique challenge posed by utility asset defects with few training examples.

The ability to identify matching images that capture the same defect of interest from the query-based image can provide analysts for electric grid operations a prioritization of utility assets. For example, identifying relationships between an image capturing a defect type of a utility asset and other images capturing similar defects can provide crucial insights in prioritizing maintenance and/or repair of utility assets deployed in the field. There is an increasing demand for the ability to identify images of utility assets with similar defects to a query image capturing a utility asset with a particular defect. By identifying matching images to the query image, preventative measures to improve resiliency and reliability of the electrical grid can be performed.

A visually perceptible defect of a piece of electric equipment can be a combination of multiple types of defects of varying severities-some of which are more likely to cause faults and/or reduced operability of the electric grid than other combinations of defects. These unique types of defects are often under-represented in image databases, with few example images capturing these unique combinations or instances of particular defects. The wide variety and large volume of image databases can often impede rapid identification of defects and therefore affect deployment of responses to defects of electrical equipment in the electric grid.

The existing computing technology leveraged by electric grid analysts are unable to identify and prioritize which defects can cause the most impact onto electric grid operations. The disclosed technology provides improved analysis and search of defects, thereby enabling improvements in identifying which types of electrical equipment to rehabilitate, repair, and/or replace. The disclosed technology can perform search, identification and prioritization of images in image bases using one-shot learning examples for query images. For example, a query image capturing a particular type of defect (or types of defects) can be provided to a computing device connected to an object search system. The object search system accesses image databases to search and provide output images that capture similar types of defects as the defects captured in the query image. The query image can often capture a type of defect that is uncommon, e.g., relative to defects that frequently occur in electrical equipment. By providing output images that match the query image based on similarity scores, the disclosed technology can provide accurate identification of electric asset defects to improve reliability and operability of electric grids. Identification and prioritization of severe defects from low-priority defects can enable dispatch of resources to remedy the severe defects and prevent electric grid downtime, e.g., blackouts.

The disclosed technology enables accurate identification and prioritization of query results for image-based search of electric utility assets by receiving input data representing an input image of a utility asset and a query-bounding box. The query bounding box can be a portion of the utility asset in the input image representing an image-based object query, e.g., a region that includes an instance of a defect of interest. The query bounding box and the input image can be processed, e.g., by an object detection model, to generate bounding boxes that indicate objects in the input, such as the utility asset, particular components of the utility asset, and objects near the utility asset. The bounding boxes can be processed by an auto-anchoring model to determine anchoring boxes, e.g., customized from the bounding boxes based on the type of utility asset. A subset of the anchoring boxes for the input image can be selected based on the query bounding box, to place an upper bound of the number of computations performed during image search.

The disclosed technology utilizes a textual label, image tokens, and image embeddings to search through image databases and identify images that match the query bounding box, e.g., capturing defects described in the input image. The textual label can be generated, e.g., by a neural network, representing the subset of anchoring boxes as object annotations describing objects captured in regions of pixels of the input image, e.g., corresponding to the subset of anchoring boxes. In parallel, the image embedding of the query bounding box can be encoded by an encoder, e.g., a visual transformer encoder, to represent the region of pixels in the input image enclosed by the query bounding box. The encoder can also generate the image tokens based on the query bounding box. Each image token represents input elements such as features of objects found in the query bounding box. An object search system can search, filter, and identify rankings of images in the image database that match the query bounding box of the input image based on a similarity score, e.g., ranking images from the highest to lower similarity score above a threshold.

FIG. 1 is a diagram of an example image search-based object detection system 100 that is configured to apply machine learning techniques to achieve one-shot, open vocabulary detection and search of images that capture defects of utility assets. The image search-based object detection system 100 includes an object search system 108 that connects to a computing device 102 that provides query image data 104 to the object search system 108. The query image data 104 can also be referred to as a "query example" for object detection and search through one or more corpora of images.

Based on the query image data 104, the object search system 108 identifies images from multiple image databases 110-1-110-N (collectively referred to as "image databases 110") that match the query image data 104, e.g., image results capturing similar defects as the query image. By identifying images in the image databases 110 that capture similar defects of utility assets to the query image data 104, the object search system 108 generates a set of ranked query-matched images 126-1-126-N (collectively referred to as "ranked query-matched images 126") for output, e.g., to computing devices and/or system. The ranked query-matched images 126 can be provided to the computing device 102, e.g., that generated the query image data 104.

The computing device 102 includes a user interface 103 to display an image of a utility asset to a viewer, e.g., an analyst searching for images of utility assets of an electric grid. A query bounding box 105 can be provided through an input device of the computing device 102, e.g., a mouse, keyboard, or other device capable of providing input to a computer. The query bounding box 105 encloses a region, e.g., pixels, of the image to capture some or all of the defects of the utility asset(s) represented by the image. The query bounding box 105 captures a defect of interest, e.g., a portion of pixels capturing the defect, in which the object search system 108 can identify matching images of utility assets with defects similar to the defect(s) in the query bounding box 105. The object search system 108 accesses images from image databases 110 and provides ranked query-matched image 126 as a set of identified images that match the query bounding box 105.

In some implementations, input to generate the query bounding box 105 includes a set of coordinates indicating positions of pixels defining a region in the image of the utility asset. Although the shape of query bounding box 105 illustrated as a rectangle in FIG. 1, the query bounding box 105 can be any shape, e.g., regular, irregular, and can include any curvature (e.g., free-form shape without sides) to define regions in the image.

In some implementations, multiple query bounding boxes 105 are provided as an image-based query search. Multiple query bounding boxes 105 can be utilized for an image-based query search to capture multiple instances and/or types of defects for a utility asset. For example, each query bounding box can enclose a respective region of the image, including overlapping or non-overlapping regions of pixels. The object search system 108 can identify a subset of images from the image databases 110 that include some or all of the defects described by the multiple query bounding boxes 105. The subset of images in the ranked query-matched images 126 can be sorted by images by similarity to the multiple query bounding boxes 105, e.g., images with more defects captured by the multiple query bounding boxes 105 are ranked higher than other images with fewer instances or combinations of the defects.

The query bounding box 105 and the image displayed on user interface 103 is provided to the object search system 108 as query image data 104. Examples of query image data are illustrated by query images 107-1-107-N (collectively referred to as "query images 107"), which include an image of a utility asset with at least one defect and a corresponding query bounding box 105 for the image. For example, image 107a illustrates a utility pole with a query bounding box 105a capturing defects 106a-106c. The defects 106a-106c enclosed in the query bounding box 105a for image 107a illustrated in FIG. 1 show fractures in the wood of the utility pole. Defect 106a is illustrated as a fracture along a surface at the top of the utility pole in the image 107a, while defects 106b and 106c are illustrated as fractures that start at the top of the utility pole and traverse downward along the side of the utility pole. A query bounding box 105 can be provided to query image databases 110 and identify ranked query-matched images 126 that include a specific type of defect, e.g., utility poles with cracks at the top of the pole structure.

In some implementations, a query bounding box 105a includes a combination of defects, e.g., defects 106a-106c, as the combination of defects can indicate a higher likelihood of equipment failure. For example, portions of the utility pole can break off (e.g., splinter) from the main body of the utility pole and damage nearby objects, e.g., electrical equipment attached to the utility pole, thereby potentially causing interruption to electrical grid operations.

In some cases, defects for utility poles include chips and other signs splintering of materials (e.g., wood, protective coatings), in the utility pole. In some cases, other types of damage can include gutted features in the wood of the utility pole. A gutted feature for a utility pole can include one or more openings disposed through the thickness of the wood in the utility pole, which can be due to rot from insects or particulates that enter through pores of the wood. In some cases, defects such as fractures can be caused by inadequate moisture levels in the wood of the utility pole. For example, excess moisture can cause the wood of the utility pole to rot. As another example, a deficiency in moisture can cause the wood to become more brittle and therefore more likely to splinter, e.g., portions of the wood breaking off. Although FIG. 1 illustrates defects 106a-106c as fractures in the wood of the utility pole, other types of defects to electrical equipment installed on the utility pole can be included in the query bounding box 105.

The image 107b illustrates a query bounding box 105b capturing defect 106d for a utility pole with electrical equipment. The defect captured in the query bounding box 105b shows the utility pole as partially fallen over, e.g., at an angle relative to the ground in which the utility pole is installed. This type of defect can occur due erosion of soil in the ground near the utility pole but can also occur due to high moisture level causing core rot of the wood in the utility pole. In some cases, weather conditions such as high winds can provide enough force to displace the utility pole, e.g., knocking over a top portion of the utility pole. In some cases, a defect for a utility pole can also include downed power lines from the utility pole, as well as downed utility poles.

The image 107c illustrates a query bounding box 105c (illustrated in FIG. 1 as a circle shape with dashed lines) capturing defect 106e for power lines (e.g., distribution lines, transmission lines). As illustrated, defect 106e shows a high density of electrical cables for the utility asset captured in image 107c. Some examples of defects in power lines include severed cables, dangling cables, and cables with excess slack. The high density of electrical cables can be due to excess dependency of electrical loads to the same point of electrical service provided by electrical equipment. For example, the pole-type transformer captured in the query bounding box 105c can provide electrical power to multiple types of loads, e.g., commercial, residential, and industrial. The high density of electrical cable can indicate a high density of electrical loads dependent on the pole-type transformer, e.g., for telephone and internet services.

The type of defect illustrated by the defect 106e in the query bounding box 105c can indicate that the existing pole-type transformer illustrated in image 107c is insufficient to provide access to the electrical grid, e.g., at the voltage level provided by the pole-type transformer. In other words, the defect 106e can indicate a demand for additional access points, e.g., points of service, to the electrical grid at the location in which image 107c was captured. For example, the defect 106e can indicate that the pole-type transformer illustrated in image 107c could be replaced and/or supplemented by an underground network transformer or multiple pole-type transformers. By including an underground network transformer, some cables can be allocated to re-routed underground and reduce the density of cables. Installing additional pole-type transformers can also help reduce the density, e.g., by utilizing utility poles at different heights and reducing the density or number of cables or utility lines at a given height.

The defects illustrated in images 107a-107c, along with other defects depicted in the images 107, can result in electrical equipment failure and interruption in provisioning electrical power to loads. The object search system 108 can process images 107 and corresponding query bounding boxes to identify images in the image databases 110 that also demonstrate similar types of defects.

The object search system 108 utilizes different types of models, encoders, token generators, neural networks, or some combination thereof, to identify ranked query-matched images 126 from the images of image databases 110. As illustrated in FIG. 1, the object search system 108 includes an object detection model 116 to detect one or more objects in the query image data 104, thereby identifying instances and classifications of utility assets in the query image. The object search system 108 also includes a neural network 120, a visual transformer encoder 122, and a visual token generator 124, to generate different types of data structures that enable the object search system 108 to perform fast-search, e.g., by filtering images in image databases 110.

The object search system 108 utilizes the object detection model 116 and auto-anchoring model 118 to generate a textual label for the query image data 104, e.g., annotations of detected objects in the image and/or query bounding box for the image from the query image data 104. The object detection model 116 generates bounding boxes indicating detected objects in the image from query image data 104, which can be processed by the auto-anchoring model 118 to generate anchoring boxes. The anchoring boxes place an upper bound on the bounding boxes that are utilized for object detection and search, e.g., enabling fast-detection of utility assets. The auto-anchoring model 118 is trained to predict an anchor box to capture scale and aspect ratio of a detected object, e.g., utility asset, in the image. Further description for generating bounding boxes and selecting an anchor box by object detection model 116 and the auto-anchoring model 118, respectively, is described in reference to FIG. 2 below.

The object search system 108 includes the neural network 120 to generate a textual label including an annotation for the detected object, e.g., the utility asset, in the query image data 104. For example, a textual label for a utility pole can include "utility pole", "power pole", or other text-based terms to describe detected objects in images. The object search system 108 also includes the visual transformer encoder 122 to generate an embedding of the image region enclosed by the query bounding box 105, e.g., embedding and encoding values of pixels for the region of the image. The generated embedding of the image region is a data structure of values, e.g., continuous values of numerical data, to describe feature data from pixels in the image region enclosed by the query bounding box 105, e.g., a portion of the query image data 104. The image embedding of the image region can be encoded to generate a dense data structure that clusters the feature data, e.g., as dense vectors.

The object search system 108 includes the visual token generator 124 to generate image tokens of the query bounding box 105, e.g., another portion of the query image data 104 that describes input elements of the query bounding box 105. For example, the image tokens can include vectors, strings, and other types of data structures to describe characteristics of the query bounding box 105. An image token can include segments of input data from the query bounding box 105 that describe the feature data, which can be mapped to data structures. Image tokens can describe different types of defects, e.g., "crack", "fracture", "corrosion", "displaced", represented in the query bounding box 105. The image tokens are an example of a discrete data structure to represent feature data (e.g., data from the image region) and/or metadata corresponding to the query bounding box 105. In some implementations, the generated image tokens represent metadata of the query bounding box 105, e.g., the number of bounding boxes, coordinates of the bounding boxes, an image identifier indicating the image for which the bounding box was generated, input mechanism for the query bounding box. In some implementations, image tokens can include a hexadecimal representation that maps pixels of the image to a visual token, e.g., an image-based token.

Images from image databases 110 can be filtered by the object search system 108 by filtering images through textual labels, image tokens, and image embeddings to identify output images, e.g., ranked query-matching images 126, for the query image data 104. Further description of the filtering approach to images of utility assets in image databases 110 is described in reference to FIG. 3 below.

Figure 2:
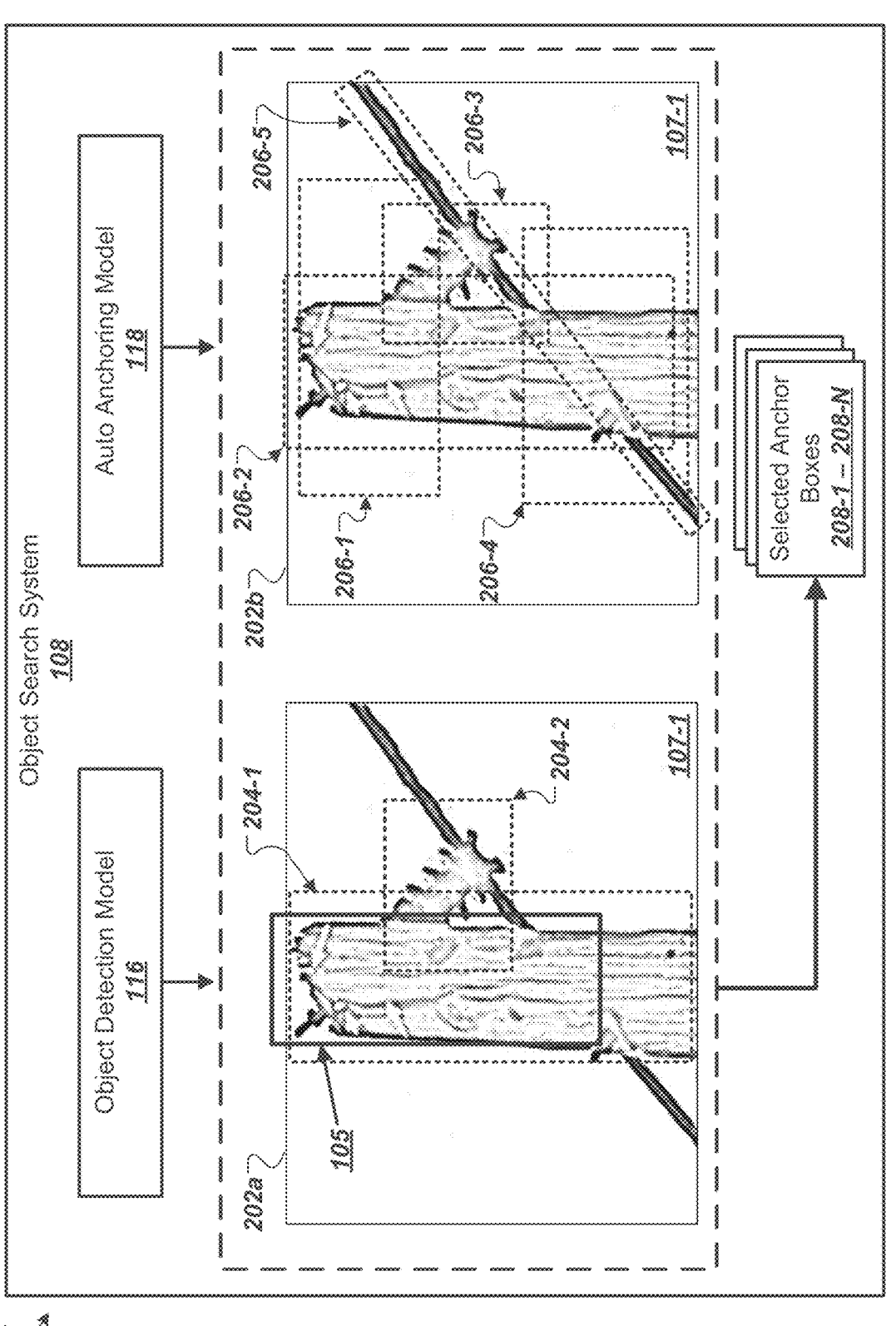
FIG. 2 is a diagram of an example object search system performing fast detection by applying anchors to a query image.

FIG. 2 is a diagram 200 of an example object search system 108 performing fast detection by performing object detection and auto-anchoring models to a query image, e.g., image 107a. The object search system 108 performs fast detection of objects in query image data 104 by utilizing object detection model 116 and auto anchoring model 118. The object search system 108 utilizes the object detection model 116 to identify bounding boxes 204-1-204-N (collectively referred to as "bounding boxes 204"). The object search system 108 utilizes the auto-anchoring model 118 to generate anchoring boxes 206-1-206-N (collectively referred to as "anchoring boxes 206") based on the bounding boxes 204 that indicate predictions for detected objects and respective object classifications for the detected objects.

The auto-anchoring model 118 generates anchoring boxes 206 that represent detected objects based on training examples with different classes of utility assets and corresponding likelihoods to aspect ratios that can be expected for different utility assets when captured by images. Based on the anchoring boxes 206, the object search system 108 selects a subset of anchoring boxes as the selected anchoring boxes 208-1-208-N (collectively referred to as "selected anchoring boxes 208") with the most overlap to query bounding box 105, e.g., an input bounding box for the query example. The selected anchor boxes 208 can be utilized to generate a textual label for the image 107a, as described in reference to FIG. 3 below.

FIG. 2 depicts an object detection frame 202a illustrating query image data 104 that is a query example, which includes image 107a of a utility pole, e.g., capturing defects 106a-106c described in reference to FIG. 1 above, and the query bounding box 105a, e.g., enclosing a region of pixels capturing defects 106a-106c. The object detection model 116 generates bounding boxes 204a-204c indicating that a number of detected objects were detected in the image 107a. Although FIG. 2 illustrates two bounding boxes corresponding to two detected objects, any number of objects can be detected.

The object detection frame 202a illustrates bounding box 204a as enclosing a first detect object, e.g., the utility pole, while bounding box 204b encloses a second detected object, e.g., a fuse cutout. The object detection model 116 generates a respective classification label for each detected object, each classification label indicating a type of utility asset, e.g., electrical equipment for an electric grid. In some implementations, the object detection model 116 generates multiple labels for a detected object in the image 107a and a corresponding confidence score for each label. The confidence score for a classification label of a detected object indicates a likelihood that the classification label correctly classifies the detected object.

In some implementations, the object detection model 116 updates bounding boxes 204 based on confidence scores for each classification label. For example, the object detection model 116 updates the bounding boxes 204, in response to determining that a confidence score does not meet a threshold value, e.g., indicating low likelihood of classifying the utility asset in the image.

Utilizing the bounding boxes 204 generated by the object detection model 116 for the query example, the auto-anchoring model 118 generates predictions for anchoring boxes 206a-206d in the image for a query example. FIG. 2 depicts an auto-anchoring frame 202b illustrating query image data 104 that includes image 107a of a utility pole and auto-anchoring boxes 206a-206d. The auto-anchoring model 118 generates anchoring boxes based on the query bounding box 105, by predicting bounding boxes based on aspect ratios of utility assets represented by images, e.g., image 107a. Particular utility assets such as utility poles can have an aspect ratio in captured images that is close to a rectangular shape, while other types of utility assets can have aspect ratios with similar width and height, e.g., closer to a square shape. Different utility assets can have corresponding aspect ratios based on relative shape and size captured in the image. Additionally, the auto-anchoring model 118 is trained to utilize values of feature data (e.g., clustering data) from the image illustrated in the auto-anchoring frame 202b with the learned aspect ratios of different utility assets and electrical components to identify a subset of anchoring boxes that match the query bounding box 105.

The object search system 108 selects anchoring boxes from the anchoring boxes 206 that overlap with the query bounding box 105. In some implementations, the object search system 108 selects an anchoring box 206 that has the largest amount of overlap with the query bounding box 105, e.g., relative to the remaining anchoring boxes. In some implementations, multiple anchoring boxes from anchoring boxes 206 are selected to include the most amount of overlap, e.g., overlapping regions of pixels in the image 107a with the query bounding box 105. The object search system 108 assigns the classification label from the selected anchoring box 208 for the query bounding box 105. For example, the classification label assigned for the query bounding box can be "utility pole" based on the anchoring box 206 with the classification label of "utility pole" being selected as the anchoring box with the most overlap. In some implementations, the object search system 108 assigns a classification label for each anchoring box in the selected anchoring boxes 208 to represent different object classifications. The selected anchoring boxes 208 can include multiple object classification labels with respective likelihoods across different object classes. In some implementations, the auto-anchoring model 118 can update the anchoring boxes 206 upon determining that an insufficient number of anchoring boxes match the query bounding box 105 for the query example, e.g., within a threshold value.

Compared to some approaches for searching image databases using query images, the implementation described in FIG. 2 provides an efficient and accurate process for generating textual labels from images of utility assets. For example, some approaches include processing all anchoring boxes and/or bounding boxes of the entire image to generate a textual label. These processes can provide inaccurate textual labels, as a neural network generated textual labels from multiple bounding boxes can result in the inclusion of multiple object classes with features that are not related to the object class of the object captured in the query example. As an example, anchoring boxes capturing features from a different object class than the object captured in the query example can result in a textual label that is less accurate, compared to an anchoring box capturing features from an anchoring box with only the object class of the query example. Furthermore, a neural network processing a subset of the anchoring boxes can significantly reduce the amount of processing time and computational load to generate a textual label for the query example, compared to a neural network configured to process anchoring and/or bounding boxes from an entire image.

The object search system 108 can provide search results with improved stability and processing speed compared to approaches that do not compare the anchoring boxes 206 to the query bounding box 105 from the query example to identify a subset of anchoring boxes. The auto-anchoring model 118 provides that detection of features captured in the query bounding box 105 can be trained for electric utility assets, thereby providing accurate and relevant results. Furthermore, the utilizing of the auto-anchoring model 118 provides that query examples with few training examples, e.g., unbalanced data, can be accurately processed based on aspect ratios of images that represent utility assets, compared to approaches that solely rely on object detection. Additionally, the auto-anchoring model 118 can be agnostic to image resolution compared to object detection-based approaches, as a reduced image resolution has a lower impact on aspect ratio than utilizing feature data from pixels of an image. The object detection-based approaches can utilize sliding windows that inadvertently process low-quality data from throughout a low-resolution image. The utilization of auto-anchoring boxes to predict regions of interest in an image of a utility asset by the object search system 108 can improve the accuracy, as lower quality data from low-resolution images does not degrade the quality of a prediction that is based on aspect ratios of utility assets captured in images.

Figure 3:
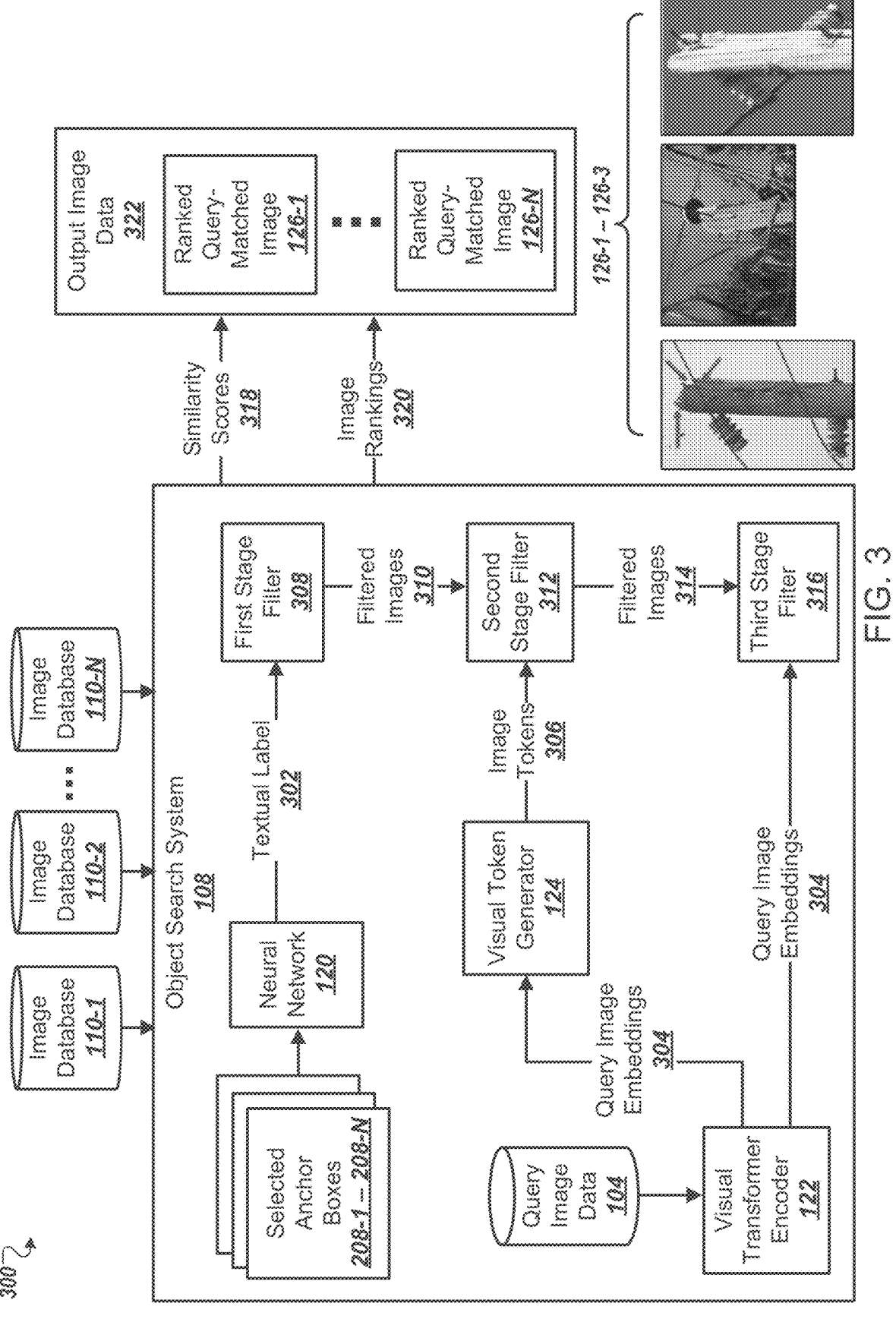
FIG. 3 is a diagram illustrating an example object search system filtering, identifying and ranking query-matched output images.

FIG. 3 is a diagram 300 illustrating object search system 108 filtering images from image databases 110 to identify and rank query-matched images 126 that match the query example, e.g., query image data 104. The object search system 108 utilizes three stages of filtering to generate similarity scores 318 and image rankings 320 as output image data 322. The output image data 322 from the object search system 108 includes the ranked query-matched images 126, which can be sorted by respective image rankings 320 from a highest similarity score to a lowest similarity score, e.g., from similarity scores 318. As illustrated in FIG. 3, the object search system 108 utilizes a textual label 302 to apply a first stage filter 308 to input images from the image databases to identify a first set of filtered images 310. The object search system 108 includes a second stage filter 312 that filters the first set of filtered images 310 using the image tokens 306 of the query image data 104 to identify a second set of filtered images 314. The object search system 108 includes a third stage filter 316 that filters the second set of filtered images 314 using query image embeddings 304, e.g., a feature embedding of query image data 104, to determine a final set out filtered output images through output image data 322, which can also include similarity scores 318 and image rankings 320 for the final set of filtered images. Although FIG. 3 depicts an example output data with three ranked query-matched images, e.g., ranked query-matched images 126a-126c, any number of query-matched images can be provided for output. The object search system 108 can also store textual labels 302, query image embeddings 304, and image tokens 306 in data storage, e.g., local computer memory, cloud storage, distributed databases, relational databases, object databases, etc.

Applying the first stage filter 308 of the object search system 108 can improve search efficiency by, e.g., search using text-based object annotations to identify the first set of filtered images 310. For instance, the text-based object annotations can be used to effacingly perform a first stage filtering search and identify images with object annotations that match the textual label 302. For example, a first stage filter 308 leverages efficiency in text-based search to identify the first set of filtered images 310 with a lower computation demand and cost, compared to applying filters that leverage tokens and embeddings, as generating tokens and embeddings can rely visual intermediary model outputs that are larger in data size than text data. Applying the second stage filter 312 to filter images using the image tokens 306 provides that an inverted index can be built from the image tokens, providing a mapping of the tokens to images that include features represented by the token. For example, the tokens and images can be recorded in key-value pairs, e.g., keys that are tokens, and values that are a list of images. Applying the third stage filter 316 to filter images using query image embeddings 304 can include computing distances between the query image embeddings 304 and image embeddings of a subset of images, e.g., after applying the first stage filter 308 and the second stage filter 312.

The object search system 108 applies a neural network 120 to the selected anchor boxes 208 to generate a textual label 302. The textual label 302 can be an object annotation describing the type of utility asset represented by the query image data 104, e.g., the image-based query. For example, the textual label 302 for the image 107a can be object annotations such as "power pole," e.g., as illustrated by image 107a of FIG. 1. The object search system 108 can filter images from image databases 110 to generated filtered images 310 that share similar object annotations as the textual label 302. The object search system 108 can generate object annotations for images obtained through image databases 110 and compare the textual label 302 to the object annotations for objects in the images from image databases 110. For example, object annotations for a utility pole illustrated in image 107a can include "power pole", "utility pole", and other similar terms for the utility asset. The object search system 108 filters images from image databases 110 with object annotations that match (e.g., exact match, relative match) to the textual label 302. In some implementations, the textual label 302 includes object annotations for other types of utility assets, e.g., network protectors, pole-type transformers, network transformers, substations, and cables.

The object search system 108 encodes the query image data 104, e.g., by a visual transformer encoder 122, to generate query image embeddings 304. The query image embeddings 304 are an embedding of the region of the query image (e.g., image 107a-107c) enclosed by the respective query bounding box (e.g., query bounding box 105a-105c) for the query image. The query image embeddings 304 for the enclosed region is a data structure of values representing the feature data captured within the enclosed region, e.g., based on pixel values for color, intensity, and other types of image data for the portion of the query image. In some implementations, the object search system 108 utilizes a number of different encoding techniques to generate the query image embeddings 304.

The visual transformer encoder 122 can also encode values of the enclosed region of the query image to generate query image embeddings 304 that are dense, e.g., clustering values for the feature data between a range of values. Dense data structures can enable faster search compared to processing values from a data structure that is not encoded. By encoding feature data from the enclosed region of the query image (e.g., from query image data 104), the visual transformer encoder 122 provides a data structure with fewer indices and values to process compared to sparse data structures. Encoding features that would otherwise be sparse into a dense feature space represented by the query image embeddings 304 can provide a greater likelihood of capturing relatively small features, such as particular types of defects for the utility asset, to be included in the query image embeddings 304.

The query image embeddings 304 can be provided to a visual token generator 124 to generate image tokens 306 that are provided to the second stage filter 312. The visual token generator 124 can generate image tokens 306 that are portions of the data represented by the query image embeddings 304. By tokenizing the data of the query image embeddings 304, portions of data for features can be extracted and mapped into respective feature spaces, e.g., the image token 306 itself. For example, an image token 306 generated by the visual token generator 124 can include feature data describing a particular type of defect identified in the query image embeddings 304. The image tokens 306 can categorize different types of features and map the feature data for similar features to the same space, e.g., the same image token 306. For example, feature data for a type of defect can be mapped to the same image token 306. The image token 306 can be utilized by the object search system 108 by applying the second stage filter 312 to image tokens for the first set of filtered images 310.

The object search system 108 can filter out images from the first set of filtered images 310 that do not match the image tokens 306 generated by the visual token generator 324. For example, the image tokens 306 corresponding to the query image data 104 for image 107*a* and query bounding box 105 can include "cracked utility poles." The object search system 108 can filter the first set of images 310 that include images that match the textual label 302 to identify the second set of filtered images 314 that include image tokens 306. For example, the object search system 108 provides the first set of images 310 that includes images of "power poles" and "utility poles" (e.g., the textual label 302 for the image 107*a* and query bounding box 105) and filter to provide the second set of filtered images 314 that includes images of "cracked power poles" or "cracked utility poles".

The object search system 108 also leverages the query image embeddings 304 to apply the third stage filter 316 to identify the output image data 322 from the second set of filtered images 314, e.g., that match the query image embeddings 304. The query image embeddings 304 represents the feature data for the query bounding box 105 and includes the feature data of the portion of the image enclosed by the query bounding box 105 of the query example. The object search system 108 applies the third stage filter 316 to identify images in the second set of filtered images 314 that are similar to the query image embeddings 304, e.g., similar to the "utility poles with cracks at the top" from the query example described in reference to FIG. 1 above.

The object search system 108 provides the output of the third stage filter 316 as output image data 322, which can include N ranked query-matched images 126. Each image can include a respective similarity score from similar scores 318 and image ranking from image rankings 320. The similar score 318 for an output image in the output image data 322 can indicate a likelihood of the output image matching the query bounding box 105 for the input image of the image-based query example. The image ranking 320 for an output image represents a ranking of the output image relative to all output images in the output image data 322 provided for image-based query example. As depict in FIG. 3, the ranked query-matched images 126*a*-126*c* illustrate examples of resulting images that match the query example provided by image 107*a* and query bounding box 105*a*, e.g., illustrating examples of utility poles with cracks/fractures at the top of the structure. In some implementations, the output image data 322 is provided for output, such as storing in a database, providing for display on a computing device, etc.

The object search system 108 can build a record of image embeddings and tokens for images in the image databases 110 to improve processing and filtering. As query examples are provided to the object search system 108, the machine learning techniques performed by any models, encoders, token generators, and neural networks of the object search system 108 can be trained to improve search and detection of utility asset defects. The object search system 108 performs machine-learning techniques to learn fast search and detection of defect types with few or no examples, e.g., from the images in image databases 110.

The object search system 108 can perform a variety of training techniques to identify images from image databases 110 that match the image-based query example, e.g., query image data 104, including supervised and unsupervised learning techniques. In some implementations, the object search system 108 performs hybrid-learning techniques to improve fast detection and search of one-shot examples. The object search system 108 can adjust one or more weights or parameters for models, encoders, token generators, neural networks, or some combination thereof. By doing so, the object search system can improve its accuracy identifying ranked query-matched images. In some implementations, the models, encoders, token generators, neural networks, or some combination thereof, include one or more fully or partially connected layers. Each of the layers can include one or more parameter values indicating an output of the layers.

Although the techniques described in this specification are described to perform fast detection and search of utility assets, the models, encoders, token generators, and neural networks of the object search system 108 can be trained to perform fast detection and search of other types of objects. The techniques described in this specification can be particularly suited for identifying images for an image search with a query example that is one-shot, e.g., few training examples capturing features in the query bounding box. These techniques can be particularly suited for object search system 108 with an open vocabulary to identify new object classifications and/or categories different from the classifications/types included in training the models, encoders, token generators, and neural networks of the object search system 108.

FIG. 4 is a flowchart illustrating an example process 400 for an object search system performing fast detection and search of image databases according to an image query.

The object search system receives an input image of a utility asset and a query bounding box enclosing a region of the input image, the query bounding box representing an image-based query (410). As described in reference to FIG. 1 above, the query image data 104 includes a query bounding box and a respective image, e.g., image 107*a*, for the image-based query. The utility asset can be at least one (i) a utility pole, (ii) a transformer, (iii) one or more wires, or (iv) other types of electrical grid distribution equipment. In some implementations, the input image of the utility asset captures at least one of (i) a type of defect, or (ii) one or more instances of a defect, of the utility asset. In some implementations, the query bounding box can be provided by at least one of (i) a user interface, or (ii) a set of coordinates. The user interface can be configured to provide the input image for display and the set of coordinates representing locations of pixels corresponding to the region of the input image enclosed by the query bounding box.

The object search system generates bounding boxes based on the input image and the query bounding box, the bounding boxes including one or more objects represented in the input image (420). In some implementations, generating the bounding boxes based on the input image and the query bounding box includes providing a training example to a model configured to perform object detection. The training example can include (i) a label for a respective classification of the one or more objects indicating identification of a utility asset and (ii) a sparse set of image data representing the utility asset.

The object search system identifies anchoring boxes based on the bounding boxes, the anchoring boxes corresponding to classifications of the one or more objects (430). The object search system can generate anchoring boxes from an auto-anchoring model that is trained to predict an anchor box, e.g., capturing the scale and aspect ratio of a detect object. The anchoring boxes for a detect object can indicate predictions, e.g., multiple likelihoods corresponding to multiple object classes, to classify the type of object, e.g., transformer, utility pole, capacitor, etc.

The object search system selects, based on the query bounding box, a subset of anchoring boxes from the anchoring boxes (440). In some implementations, selecting the subset of anchoring boxes includes determining that the subset of anchoring boxes match the query bounding box within a threshold value. The object search system can update the anchoring boxes by a model configured to perform auto-anchoring of anchoring boxes, based on determining that the subset of anchoring boxes do not match the query bounding box within the threshold value. In some implementations, the object search system selects anchoring boxes with the most overlap to a query bounding box.

The object search system determines a textual label for the subset of anchoring boxes (450). In some implementations, determining the textual label for the subset of anchoring boxes includes determining annotations representing one or more detected objects in the subset of anchoring boxes. In some implementations, determining the textual label for the subset of anchoring boxes includes comparing, by a neural network configured to generate textual labels, a ground truth label for the subset of anchoring boxes to the textual label. Determining the textual label can include updating one or more parameters of the neural network, based on the comparison of the ground truth label and the textual label for the subset of anchoring boxes.

The object search system encodes an image embedding of the query bounding box, the image embedding representing the region of the input image (460). In some implementations, encoding the image embedding of the query bounding box includes generating a reconstructed image, by a visual transformer encoder and based on the image embedding for the bounding boxes. The object search system can compare the reconstructed image to the input image and update one or more parameters of the visual transformer encoder based on the comparison of the reconstructed image to the input image.

The object search system generates one or more image tokens from the query bounding box, each of the one or more image tokens representing an input element of the query bounding box (470). Images token can include various types of data structures to represent feature data of the query bounding box. In some implementations, the object search system uses a visual token generator to generate the image token.

The object search system identifies, from an image database that includes a plurality of images, one or more output images of other utility assets relevant to the image-based object query based on the encoded image embedding, the one or more image tokens, and the textual label (480). In some implementations, the object search system identifies a multiple, successive set of output images from multiple, successive filters. As described in reference to FIG. 3 above, the first filter can be configured to filter images based on the textual label, the second filter can be configured to filter images based on the image tokens, and the third filter can be configured to filter images based on the encoded image embeddings. The output images can be ranked according to a similarity score indicating a likelihood of the image embedding for an image matching the image embedding of the query image.

The object search system provides the one or more images for output (490). The output images can be provided to a device that provides the query image. In some implementations, the output images can be provided to one or more computing devices.

Figure 5:
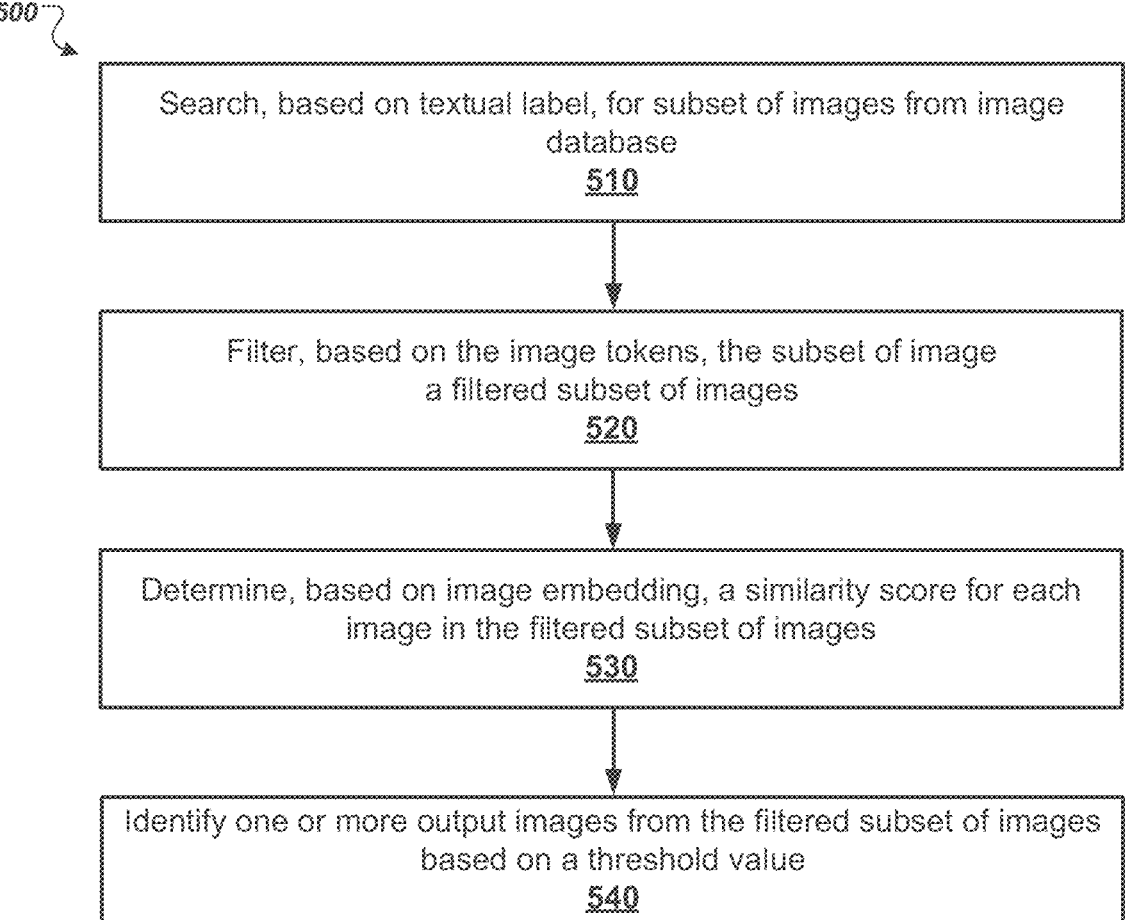
FIG. 5 is a flowchart illustrating an example process performed by an object search system to filter and rank image results from an image-based object query.

FIG. 5 is a flowchart illustrating an example object search process 500. Process 500 can be executed by one or more computing systems including, but not limited to, the object search system 108.

The object search system searches for a subset of images from the one or more images of the image database based on the textual label (510). The subset of images excludes one or more images of the image database that do not include a label that matches the textual label.

The object search system filters the subset of images to determine a filtered subset of images based on the one or more image tokens (520). The filtered subset of images excludes one or more images of the subset images that do not include at least one token from the one or more image tokens.

The object search system determines a similarity score for each image in the filtered subset of images based on the image embedding (530). The similarity score for an image indicates a likelihood of a respective image matching the image embedding of the query image.

The object search system identifies one or more output images from the filtered subset of images (540). Each image in the one or more output images has a similarity score that exceeds a threshold value. In some implementations, identifying the one or more output images includes performing a nearest neighbor search of one or more image embeddings of the filtered subset of images, from the image embedding of the query bounding box. In some implementations, the object search system provides the one or more output images with a ranking of the one or more output images. The ranking of the one or more output images can be based on the similarity score of the respective output image.

Figure 6:
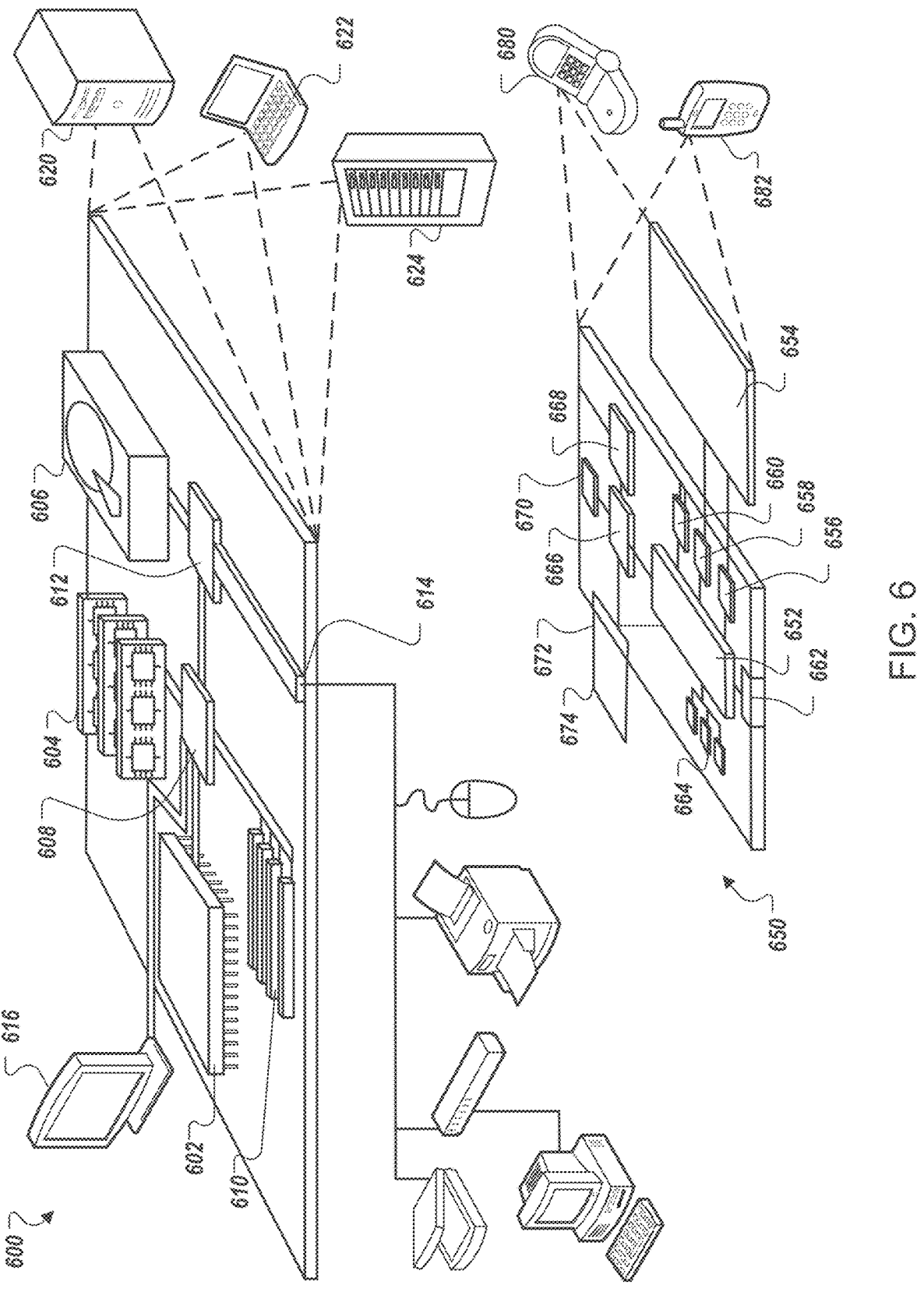
FIG. 6 is a schematic diagram of a computer system.

FIG. 6 is a diagram illustrating an example of a computing system used in an image search-based object detection system. The computing system includes computing device 600 and a mobile computing device 650 that can be used to implement the techniques described herein. For example, one or more components of the image search-based object detection system 100 could be an example of the computing device 600 or the mobile computing device 650.

The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various buses, and may be mounted on a common motherboard or in other manners as appropriate. The processor 602 can process instructions for execution within the computing device 600, including instructions stored in the memory 604 or on the storage device 606 to display graphical information for a Graphical User Interface (GUI) on an external input/output device, such as a display 616 coupled to the high-speed interface 608. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 602 is a single threaded processor. In some implementations, the processor 602 is a multi-threaded processor. In some implementations, the processor 602 is a quantum computer.

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602). The high-speed interface 608 manages bandwidth-intensive operations for the computing device 600, while the low-speed interface 612 manages lower bandwidth-intensive operations. Such allocation of functions is an example only. In some implementations, the high speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device, such as a mobile computing device 650. Each of such devices may include one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provided as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (nonvolatile random access memory). In some implementations, instructions are stored in an information carrier such that the instructions, when executed by one or more processing devices (e.g., processor 652), perform one or more methods, such as those described above. The instructions can also be stored by one or more storage devices, such as one or more computer or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry in some cases. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 3G/4G cellular, among others. Such communication may occur, for example, through the transceiver 668 using a radio frequency. In addition, short-range communication may occur, such as using a Bluetooth, Wi-Fi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, among others) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose micro-processors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively in communication to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads. Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for image search-based object detection, the method comprising:

receiving input data comprising an input image of a utility asset and a query bounding box, the query bounding box enclosing a region of the input image that contains a portion of the utility asset representing an image-based object query;

generating bounding boxes based on the input image and the query bounding box, the bounding boxes comprising one or more objects represented in the input image;

identifying anchoring boxes based on the bounding boxes, the anchoring boxes corresponding to classifications of the one or more objects;

selecting, based on the query bounding box, a subset of anchoring boxes from the anchoring boxes;

generating an encoded query image embedding of the region of the input image represented by the query bounding box, the encoded query image embedding representing the region of the input image;

generating one or more image tokens from the encoded query image embedding of the query bounding box, each of the one or more image tokens representing an input element of the query bounding box;

filtering, from an image database comprising a plurality of images and based on the one or more image tokens, the plurality of images to obtain a subset of images, wherein the subset of images excludes images that do not include at least one token corresponding with the one or more image tokens; and determining, from the subset of images and based on the encoded query image embedding, one or more output images of other utility assets relevant to the image-based object query, wherein the one or more output images comprise an image embedding that at least partially matches the encoded query image embedding; and providing, as output, the one or more output images.

2. The method of claim 1, further comprising:

searching, based on a textual label representing the subset of anchoring boxes, for a set of images from the plurality of images in the image database, wherein the set of images excludes one or more images from the pluarlity of images in the image database that do not include a label that matches the textual label;

determining, based on the encoded query image embedding, a similarity score for each image in the set of images, wherein the similarity score indicates a likelihood of a respective image having an embedding matching the encoded query image embedding of the input image; and identifying the one or more output images from the set of images, the one or more output images each having a respective similarity score exceeds a threshold value.

3. The method of claim 2, wherein identifying the one or more output images comprises performing a nearest neighbor search of one or more image embeddings for the set of images from the encoded query image embedding of the query bounding box.

4. The method of claim 2, wherein further comprising ranking the one or more output images based on the respective similarity score of each output image in the one or more output images.

5. The method of claim 2, wherein the textual label for the subset of anchoring boxes is determined from annotations representing one or more detected objects in the subset of anchoring boxes.

6. The method of claim 2, wherein determining the textual label for the subset of anchoring boxes comprises:

comparing, by a neural network configured to generate textual labels, a ground truth label for the subset of anchoring boxes to the textual label to obtain a comparison result; and updating one or more parameters of the neural network based on the comparison result.

7. The method of claim 1, wherein the utility asset is at least one of (i) a utility pole, (ii) a transformer, (iii) one or more wires, or (iv) other types of electrical grid distribution equipment.

8. The method of claim 1, wherein the input image of the utility asset captures at least one of (i) a type of defect, or (ii) one or more instances of a defect, of the utility asset.

9. The method of claim 1, wherein the query bounding box enclosing the region of the input image is provided by at least one of (i) a user interface, or (ii) a set of coordinates, the user interface configured to provide the input image for display and the set of coordinates representing locations of pixels corresponding to the region of the input image enclosed by the query bounding box.

10. The method of claim 1, wherein generating the bounding boxes based on the input image and the query bounding box comprises providing a training example to a model configured to perform object detection, wherein the training example comprises (i) a label for a respective classification of the one or more objects indicating identification of a utility asset and (ii) a sparse set of image data representing the utility asset.

11. The method of claim 1, wherein selecting the subset of anchoring boxes from the anchoring boxes comprises:

determining that the subset of anchoring boxes match the query bounding box within a threshold value; and based on determining that the subset of anchoring boxes do not match the query bounding box within the threshold value, updating the anchoring boxes by a model configured to perform auto-anchoring of anchoring boxes.

12. The method of claim 1, wherein generating the encoded query image embedding of the query bounding box comprises:

generating, by a visual transformer encoder and based on the encoded query image embedding for the bounding boxes, a reconstructed image;

comparing the reconstructed image to the input image to obtain a comparison result; and updating one or more parameters of the visual transformer encoder based on the comparison result.

13. A system for performing object detection and search of utility assets in an image database, the system comprising:
one or more computers and one or more storage devices storing instructions that are operable, when executed by the one or more computers, to cause the one or more computers to perform operations comprising:
receiving input data comprising an input image of a utility asset and a query bounding box, the query bounding box enclosing a region of the input image that contains a portion of the utility asset representing an image-based object query;
generating bounding boxes based on the input image and the query bounding box, the bounding boxes comprising one or more objects represented in the input image;
identifying anchoring boxes based on the bounding boxes, the anchoring boxes corresponding to classifications of the one or more objects;
selecting, based on the query bounding box, a subset of anchoring boxes from the anchoring boxes;
generating an encoded query image embedding of the region of the input image represented by the query bounding box, the encoded query image embedding representing the region of the input image;
generating one or more image tokens from the encoded query image embedding of the query bounding box, each of the one or more image tokens representing an input element of the query bounding box;
filtering, from an image database comprising a plurality of images and based on the one or more image tokens, the plurality of images to obtain a subset of images, wherein the subset of images excludes images that do not include at least one token corresponding with the one or more image tokens; and
determining, from the subset of images and based on the encoded query image embedding, one or more output images of other utility assets relevant to the image-based object query, wherein the one or more output images comprise an image embedding that at least partially matches the encoded query image embedding; and
providing, as output, the one or more output images.

14. The system of claim 13, the operations further comprising:
searching, based on a textual label representing the subset of anchoring boxes, for a set of images from the plurality of images in the image database, wherein the subset-set of images excludes one or more images from the plurality of images in the image database that do not include a label that matches the textual label;
determining, based on the encoded query image embedding, a similarity score for each image in the set of images, wherein the similarity score indicates a likelihood of a respective image having an embedding matching the encoded query image embedding of the input image; and
identifying the one or more output images from the filtered subset-set of images, the one or more output images each having a respective similarity score exceeds a threshold value.

15. The system of claim 14, wherein identifying the one or more output images comprises performing a nearest neighbor search of one or more image embeddings for the set of images from the encoded query image embedding of the query bounding box.

16. The system of claim 14, wherein providing the one or more output images further comprises:
ranking the one or more output images based on the respective similarity score of each output image in the one or more output images.

17. The system of claim 14, wherein the textual label for the subset of anchoring boxes is determined from annotations representing one or more detected objects in the subset of anchoring boxes.

18. The system of claim 13, wherein the query bounding box enclosing the region of the input image is provided by a user interface.

19. A non-transitory, computer-readable medium storing one or more instructions executable by a computer system to perform operations comprising:
receiving input data comprising an input image of a utility asset and a query bounding box, the query bounding box enclosing a region of the input image that contains a portion of the utility asset representing an image-based object query;
generating bounding boxes based on the input image and the query bounding box, the bounding boxes comprising one or more objects represented in the input image;
identifying anchoring boxes based on the bounding boxes, the anchoring boxes corresponding to classifications of the one or more objects;
selecting, based on the query bounding box, a subset of anchoring boxes from the anchoring boxes;
generating an encoded query image embedding of the region of the input image represented by the query bounding box, the encoded query image embedding representing the region of the input image;
generating one or more image tokens from the encoded query image embedding of the query bounding box, each of the one or more image tokens representing an input element of the query bounding box;
filtering, from an image database comprising a plurality of images and based on the one or more image tokens, the plurality of images to obtain a subset of images, wherein the subset of images excludes images that do not include at least one token corresponding with the one or more image tokens; and
determining, from the subset of images and based on the encoded query image embedding, one or more output images of other utility assets relevant to the image-based object query, wherein the one or more output images comprise an image embedding that at least partially matches the encoded query image embedding; and
providing, as output, the one or more output images.

20. The non-transitory, computer-readable medium of claim 19, the operations further comprising:
searching, based on a textual label representing the subset of anchoring boxes, for a set of images from the plurality of images in the image database, wherein the set of images excludes one or more images from the plurality of images in the image database that do not include a label that matches the textual label;
determining, based on the encoded query image embedding, a similarity score for each image in the set of images, wherein the similarity score indicates a likelihood of a respective image having an embedding matching the encoded query image embedding of the input image; and identifying the one or more output images from the set of images, the one or more output images each having a respective similarity score exceeds a threshold value.

\* \* \* \* \*